(12) United States Patent
Kameyama et al.

(10) Patent No.: US 6,397,004 B1
(45) Date of Patent: May 28, 2002

(54) LENS-FITTED PHOTO FILM UNIT

(75) Inventors: Nobuyuki Kameyama; Osamu Noguchi; Hajime Nihojima, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/566,389

(22) Filed: May 8, 2000

(30) Foreign Application Priority Data

May 7, 1999 (JP) .............................. 11-127362

(51) Int. Cl.[7] .............................. G03B 17/02
(52) U.S. Cl. .................. 396/6; 396/373; 396/535
(58) Field of Search ................ 396/6, 25, 29, 396/373, 382, 535

(56) References Cited

U.S. PATENT DOCUMENTS

| | | |
|---|---|---|
| 4,804,987 A | 2/1989 | Arai |
| 4,812,863 A | 3/1989 | Ohmura et al. |
| 4,812,866 A | 3/1989 | Ushiro et al. |
| 5,028,943 A * | 7/1991 | Ishii et al. ............ 396/535 |
| 5,361,108 A | 11/1994 | Kamata et al. |
| 5,710,946 A * | 1/1998 | Rydelck et al. ............ 396/25 |
| 5,897,221 A | 4/1999 | Moriya |
| 6,075,944 A * | 6/2000 | Balling et al. ............ 396/6 |
| 6,078,749 A * | 6/2000 | Rydelck ............ 396/6 |
| 6,173,127 B1 * | 1/2001 | Glover et al. ............ 396/6 |
| 6,282,374 B1 * | 8/2001 | Boyd et al. ............ 396/6 |
| 6,282,375 B1 * | 8/2001 | Boyd et al. ............ 396/6 |

FOREIGN PATENT DOCUMENTS

| | | |
|---|---|---|
| EP | 0380118 A2 | 8/1990 |
| EP | 0878731 A1 | 11/1998 |
| GB | 2207252 A | 1/1989 |
| JP | 5303133 | 11/1993 |
| JP | 5341447 | 12/1993 |

* cited by examiner

*Primary Examiner*—Alan A. Mathews
(74) *Attorney, Agent, or Firm*—Young & Thompson

(57) ABSTRACT

A lens-fitted photo film unit includes an opaque main body pre-loaded with photo film. An opaque rear cover covers a rear of the main body. A front cover covers a front of the main body. A viewfinder eyepiece opening is formed through the rear cover. A viewfinder objective opening is formed in the front cover, combined with the viewfinder eyepiece opening, and adapted to observation of a photographic field. The front cover is produced from transparent material. A field frame member is disposed on an edge of the viewfinder objective opening, visible through the viewfinder eyepiece opening, for indicating a photographable region in the photographic field.

31 Claims, 8 Drawing Sheets

LENS-FITTED PHOTO FILM UNIT

BACKGROUND OF THE INVENTION

1. Field of the Invention

The present invention relates to a lens-fitted photo film unit. More particularly, the present invention relates to a lens-fitted photo film unit in which a front cover is transparent for newly designing the appearance of the product.

2. Description Related to the Prior Art

A lens-fitted photo film unit is pre-loaded with unexposed photo film, and incorporates mechanisms for taking exposures. A lens-fitted photo film unit is characterized in that, when a user purchases it, he or she can take photographs readily and easily. The lens-fitted photo film unit is used widely mainly because of its usefulness.

In a photographic camera, a field frame indicia is observable inside a viewfinder optical system to indicate a photographable region for taking an exposure on photo film. In FIG. 10, a viewfinder objective opening 14 has an opening edge 14a, and limits a light flux of object light incident upon an objective lens 31a. The opening edge 14a makes it possible to observe only the photographable region when a user observes a photographic field through a viewfinder eyepiece opening 18. Note that a base member 30a of an exposure unit is located between a front cover 22 and a rear cover 23, and supports an eyepiece lens 31b combined with the objective lens 31a.

Various ideas for modifying the lens-fitted photo film unit are conceived. To change its appearance, it may be conceivable to produce some of plastic parts in a transparent manner, which is known as a skeleton type. In particular, transparency of the front cover may be conceivable in the lens-fitted photo film unit. This is because the photo film must be contained therein. It is necessary to keep the light-tightness of a main body, the rear cover and the exposure unit in view of shielding light from a photographic light path and chambers for accommodating the photo film.

However, a problem arises in that the transparency of the front cover makes the opening edge of the viewfinder objective window unclear to an eye of a user observing through the viewfinder. A region that can be photographed becomes not discernible to the user.

For the resin for molding the front cover, polystyrene resin is the most preferable because of a low manufacturing cost and suitability for recycling, the polystyrene resin having been widely used for molding the front and rear covers. However, a totally transparent piece molded from the polystyrene resin is considerably fragile, and cannot have a sufficiently high shock strength.

SUMMARY OF THE INVENTION

In view of the foregoing problems, an object of the present invention is to provide a lens-fitted photo film unit in which a front cover is transparent, and also an photographable region in a viewfinder is clearly discernible to a user.

Another object of the present invention is to provide a lens-fitted photo film unit in which a front cover is transparent, and also which has a high shock strength.

Still another object of the present invention is to provide a lens-fitted photo film unit in which a front cover is transparent, and also an outer packaging member has a suitable appearance in combination with the front cover.

In order to achieve the above and other objects and advantages of this invention, a lens-fitted photo film unit includes an opaque main body pre-loaded with photo film. An opaque rear cover covers a rear of the main body. A front cover covers a front of the main body. A viewfinder eyepiece opening is formed through the rear cover. A viewfinder objective window is formed in the front cover, combined with the viewfinder eyepiece opening, and adapted to observation of a photographic field. At least a portion of the front cover is produced from material for transmitting light therethrough. A field frame portion is disposed on an edge of the viewfinder objective window, visible through the viewfinder eyepiece opening, for indicating a photographable region in the photographic field.

Furthermore, the material for the front cover is resin that is colorless and transparent or is colored and transparent.

A housing is constituted by combining the main body, the rear cover and the front cover. There is an outer packaging member, of which at least a portion is produced from material for transmitting light therethrough, and which is secured to an outside of the housing.

The field frame portion is produced from material for absorbing at least part of light incident thereon, and an inside of the field frame portion defines the photographable region.

By this construction, the photographable region in a viewfinder is clearly discernible to a user, because the field frame portion can been recognized by an eye of a user observing the photographic field through the viewfinder.

The material for the field frame portion is resin.

The field frame portion is a frame-shaped member, and has a frame-shaped inclined surface inclined at a predetermined incident angle with reference to the viewfinder objective window.

The viewfinder objective window is a viewfinder objective opening formed through the front cover.

According to a preferred embodiment, the front cover is colorless and transparent, and the viewfinder objective window is a plate-shaped portion of the front cover.

According to another preferred embodiment, the field frame portion is a frame-shaped plate secured to a rear of an edge of the viewfinder objective window.

The frame-shaped plate is produced by pressing.

The frame-shaped plate is fixedly positioned on the front cover by use of one of forced insertion, caulking, welding and insert molding.

According to a further preferred embodiment, the field frame portion is a frame-shaped coating pattern disposed on a front of an edge of the viewfinder objective window.

The outer packaging member has at least a portion disposed on a front face of the front cover. The coating pattern is formed on a portion of the outer packaging member disposed on a periphery of the viewfinder objective window.

According to another preferred embodiment, the outer packaging member has at least a portion disposed on a front face of the front cover. Furthermore, an outer opening is formed in the outer packaging member, disposed in front of the viewfinder objective window, the outer opening being smaller than the viewfinder objective window, and having an edge for constituting the field frame portion.

According to an additional preferred embodiment, the outer packaging member has at least a portion disposed on a front face of the front cover. Furthermore, an outer opening is formed in the outer packaging member, for uncovering the viewfinder objective window.

The front cover is colorless and transparent, and the outer packaging member is colored and transparent.

According to another preferred embodiment, the front cover is colored and transparent, and the outer packaging member is colored and transparent.

The viewfinder objective window is a viewfinder objective opening formed through the front cover, and having an edge for constituting the field frame portion.

According to still another preferred embodiment, the front cover is colorless and transparent, and the outer packaging member is colorless and transparent.

According to another preferred embodiment, the front cover is colored and transparent, and the outer packaging member is colorless and transparent.

By this construction, the outer packaging member has a suitable appearance in combination with the front cover because of their transparency.

The outer packaging member is belt-shaped, and fitted on a rear, a front, a top and a bottom of the housing.

The material for the outer packaging member is resin.

The resin of the front cover is ABS resin, or copolymer resin obtained by copolymerization of polystyrene resin and acrylic resin.

By this construction, the front cover has a high shock strength.

The front cover has outer and inner surfaces one of which has surface roughness, and is translucent.

According to another aspect of the present invention, a lens-fitted photo film unit includes a housing pre-loaded with photo film in a light-tight manner. An opaque rear cover constitutes a rear of the housing. A front cover constitutes a front of the housing, at least a portion of the front cover being produced from material for transmitting light therethrough. An outer packaging member is secured to an outside of the housing, at least a portion of the outer packaging member being produced from material for transmitting light therethrough.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
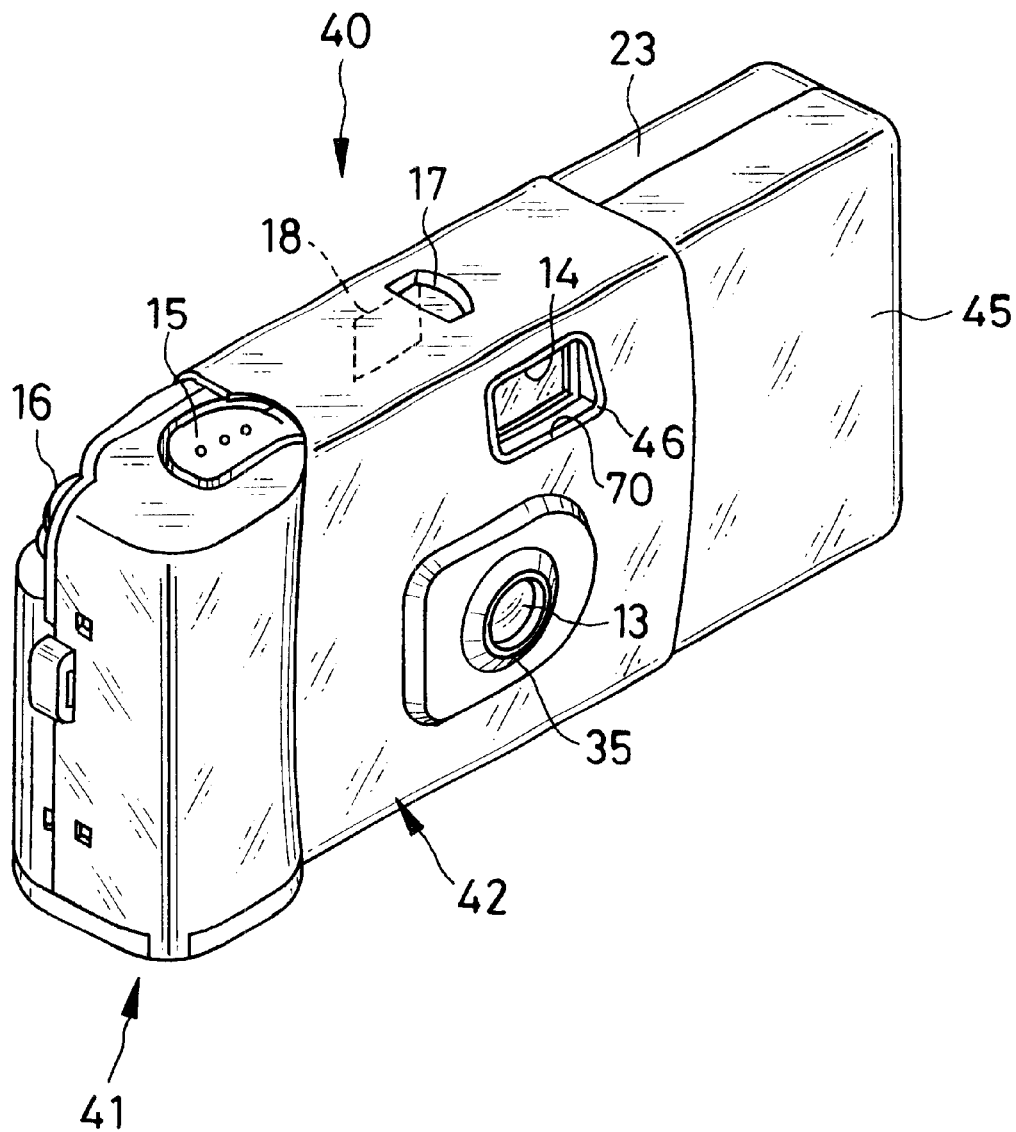
FIG. 1 is a perspective illustrating a lens-fitted photo film unit.

In FIG. 1, a lens-fitted photo film unit 40 is illustrated. The lens-fitted photo film unit 40 is constituted by a housing 41 with an outer packaging belt 42 that wraps the center of the housing 41. Parts of the housing 41 are respectively formed from plastic material. The front of the housing 41 is provided with a taking lens 13 and viewfinder objective opening 14. The top of the housing 41 is provided with a shutter release button 15, winder wheel 16 and frame counter window 17. The rear of the housing 41 is provided with a viewfinder eyepiece opening 18. The outer packaging belt 42 neatens the appearance of the lens-fitted photo film unit 40, and is provided with a printed decorative pattern on its outer surface. Openings are formed in the outer packaging belt 42 for uncovering such portions of the housing 41 as the taking lens 13, viewfinder objective opening 14, frame counter window 17 and viewfinder eyepiece opening 18. Photographs can be taken while the outer packaging belt 42 is kept attached about the housing 41.

Furthermore, there are various signs and letters, printed on the surface of the outer packaging belt 42, for indicating a product name and product type of the lens-fitted photo film unit 40, and an explanation, notice and other information to users on the lens-fitted photo film unit 40.

Figure 2:
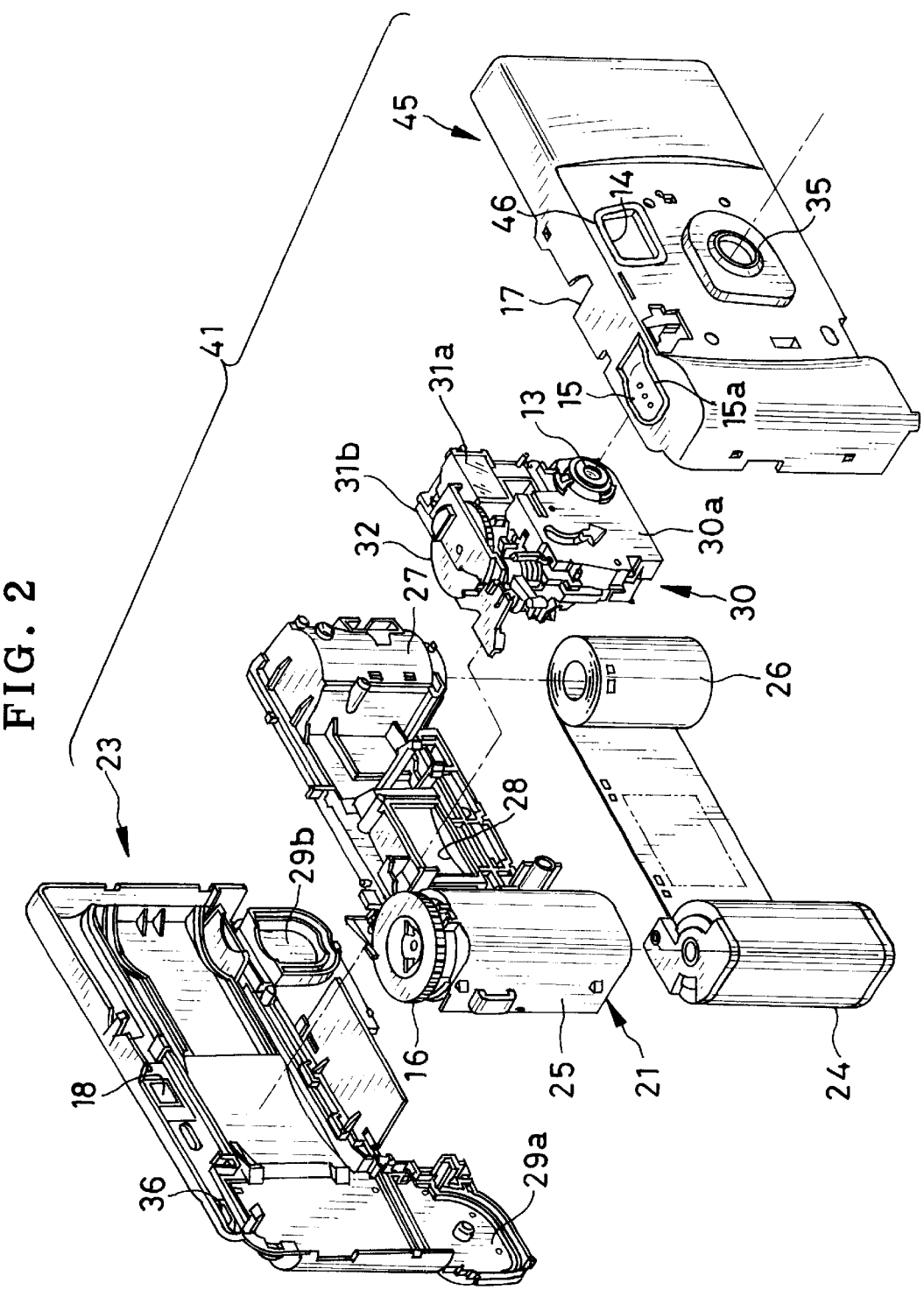
FIG. 2 is an exploded perspective illustrating the lens-fitted photo film unit.
Figure 3:
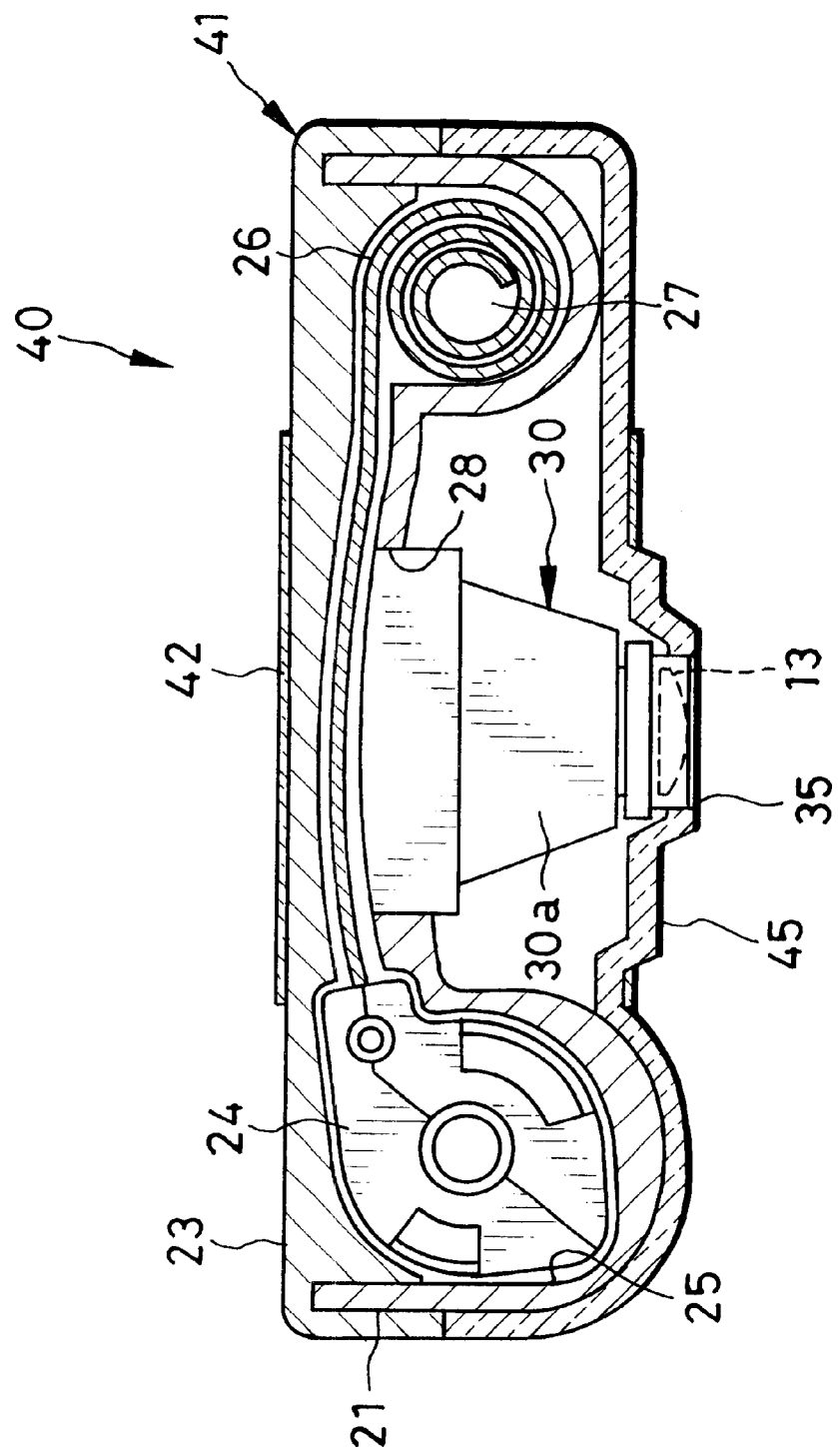
FIG. 3 is a horizontal section illustrating the lens-fitted photo film unit.

In FIGS. 2 and 3, the housing 41 includes a main body 21, rear cover 23 and front cover 45. The rear cover 23 and front cover 45 cover the rear and front of the main body 21. There are a cassette holder chamber 25 and roll holder chamber 27 in the main body 21, the cassette holder chamber 25 containing a cassette shell 24, and the roll holder chamber 27 containing a roll of photo film 26. An exposure aperture 28 is formed in the main body 21 for defining a region in which the photo film 26 is exposed. Bottoms of the cassette holder chamber 25 and roll holder chamber 27 are open, and closed by bottom lids 29a and 29b extended from a bottom edge of the rear cover 23. The winder wheel 16 is disposed on the top wall of the cassette holder chamber 25.

In the main body 21, an exposure unit 30 is secured to the front of the exposure aperture 28, and is kept squeezed between the front cover 45 and rear cover 23. A base member 30a is included in the exposure unit 30, and supports the taking lens 13, a viewfinder optical system, a shutter mechanism and the like as a unified component. The elements in the exposure unit 30 include an objective lens 31a, eyepiece lens 31b and frame counter disk 32.

A lens opening 35 is formed in the front cover 45 as well as the viewfinder objective opening 14. A top wall of the front cover 45 is provided with the shutter release button 15 and frame counter window 17. For the shutter release button 15, an opening 15a is formed in the top wall of the front cover 45. The shutter release button 15 projects from an edge of the opening 15a, but is originally formed as a portion of the front cover 45 and structured shiftable with resiliency. A slot 36 is formed in the rear cover 23 as well as the viewfinder eyepiece opening 18. The lens opening 35 uncovers the taking lens 13 at the exposure unit 30. The viewfinder objective opening 14 and viewfinder eyepiece opening 18 uncover respectively the objective lens 31a and eyepiece lens 31b. In the frame counter window 17 appears the frame counter disk 32. Also, the winder wheel 16 partially projects from the slot 36.

The outer packaging belt 42 is a transparent film of resin, and has an outer opening 70 that uncovers the viewfinder.

The main body 21 and rear cover 23 are plastic pieces molded by injection molding from resin with a light-shielding characteristic. Thus, the main body 21 and rear cover 23 are opaque and have a dark color. The front cover 45, which determines appearance of the lens-fitted photo film unit 40, is a piece molded by injection molding from transparent resin. A light path of light from a photographic object is shielded from ambient light by the base member 30a and main body 21 behind the taking lens 13. When the rear cover 23 is fitted to the rear of the main body 21, the photo film 26 is contained between the main body 21 and rear cover 23 in a light-tight manner.

Preferred examples of the resin for forming the front cover 45 are copolymer resin obtained by copolymerization of polystyrene resin and acrylic resin, and ABS (acrylonitrile-butadiene-styrene) resin. Although the polystyrene resin is too fragile if used solely, the copolymerization of the polystyrene resin and acrylic resin increases its shock strength. Also, the ABS resin has higher rigidity and higher shock strength than the polystyrene resin. Thus, the use of those types of resins makes it unnecessary to add reinforcing material for increasing the shock strength. The transparency of the resin can be maintained by the lack of addition of such material.

Figure 4:
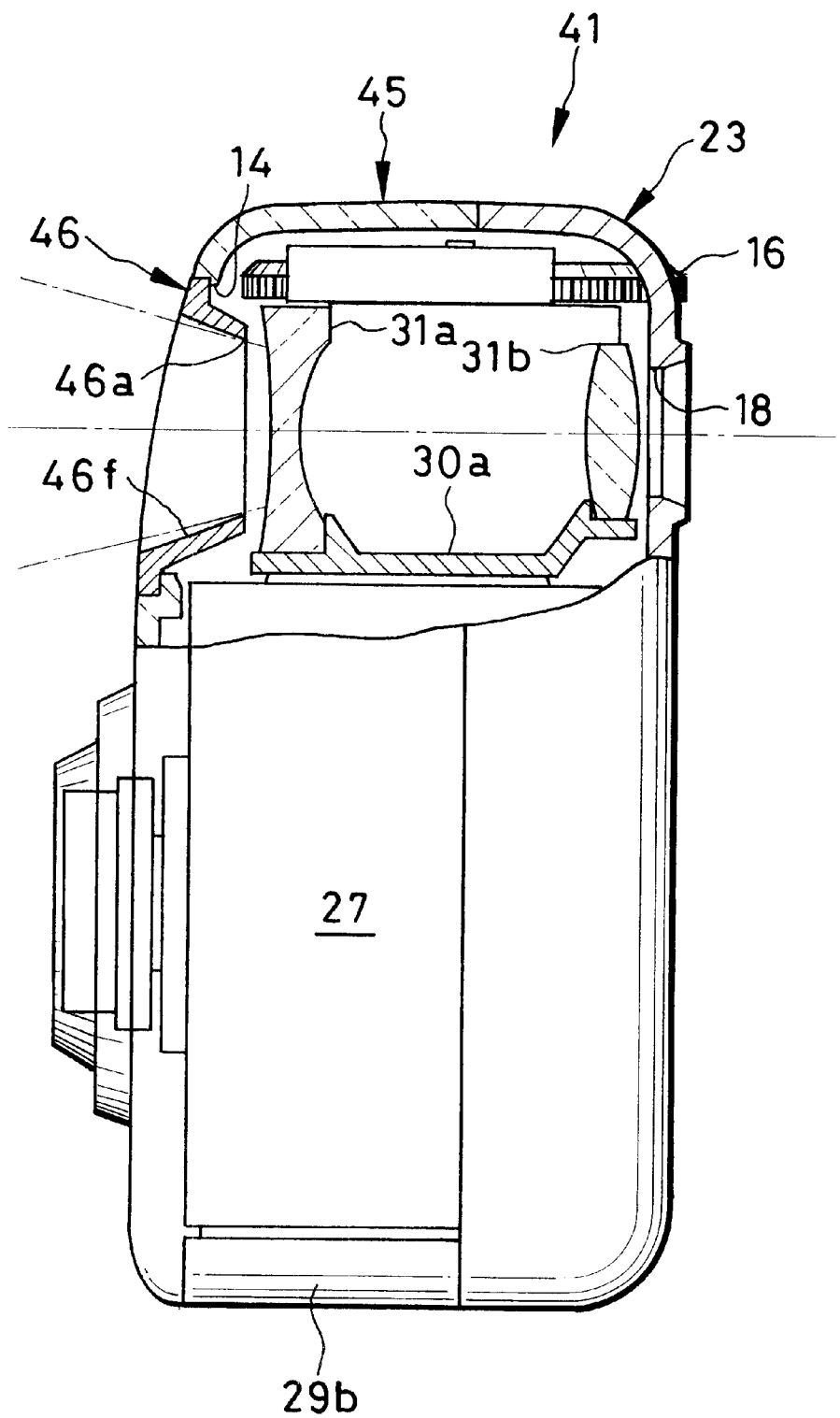
FIG. 4 is a side elevation, partially in a cross section, illustrating the lens-fitted photo film unit and particularly its viewfinder with a field frame portion.

In FIG. 4, a field frame member 46 or quadrilateral tube is fitted on the inside of the viewfinder objective opening 14, and is a molded piece of opaque resin in a frame shape. An opening 46a in the field frame member 46 has such a size as to pass light only from a photographable region for taking an exposure. Light from the outside of the photographable region is prevented by the field frame member 46 from entry into the viewfinder light path. Note that the region observable through the viewfinder is determined smaller than a region actually photographable on the photo film for the reason of parallax between the taking lens and viewfinder-optical system, as is according to a well-known construction. Also, the field frame member 46 is provided with an inclined surface 46f.

Note that it is preferred to mold the field frame member 46 from resin the same as that for the front cover 45. This is effective in recycling the lens-fitted photo film unit 40, as the front cover 45 can be withdrawn, ground and re-pelletized together with the field frame member 46. Furthermore, it is desirable to retain the field frame member 46 fixedly on an edge of the viewfinder objective opening 14 to avoid drop of the field frame member 46 from the viewfinder objective opening 14. For this retention, the field frame member 46 may be fixed by forced insertion, caulking, or the like of a portion of the edge of the viewfinder objective opening 14 to the periphery of the field frame member 46. Furthermore, portions of the front cover 45 and field frame member 46 in contact with each other may be welded together by ultrasonic welding. Also, an insert molding method can be used to mold the front cover 45 in a manner holding the field frame member 46.

In operation, the inside of the housing 41 in the lens-fitted photo film unit 40 is visible through the front cover 45 formed from the transparent resin. Also, the field frame member 46 is fitted in the viewfinder objective opening 14 in the front cover 45, and is opaque. An image of the field frame member 46 is visible clearly within the viewfinder. The field frame member 46 avoids entry of ambient light from the outside of the photographable region. A photographic field in only the photographable region can be observable in the viewfinder.

Figure 5:
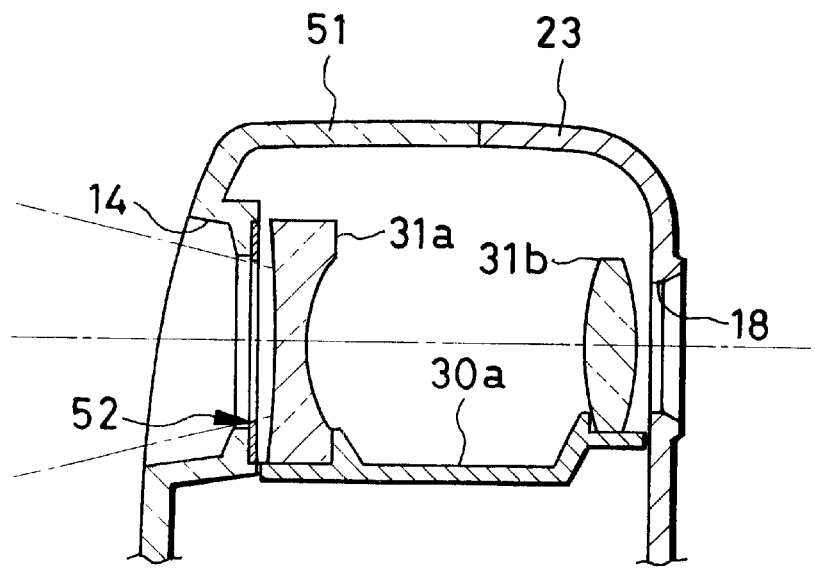
FIG. 5 is a cross section illustrating another preferred viewfinder having a frame-shaped field frame plate.

In FIG. 5, another preferred embodiment is illustrated, in which a field frame plate 52 or frame-shaped plate is fitted on the viewfinder objective opening 14. The field frame plate 52 is produced by a process of pressing a thin opaque plate. The field frame plate 52 can be any of a metal plate, plastic plate and the like. Again, it is desirable to retain the field frame plate 52 fixedly on an edge of a front cover 51 to avoid drop of the field frame plate 52 from the front cover 51. For this retention, the field frame plate 52 may be fixed by forced insertion, caulking, ultrasonic welding, insert molding, or the like.

Figure 6:
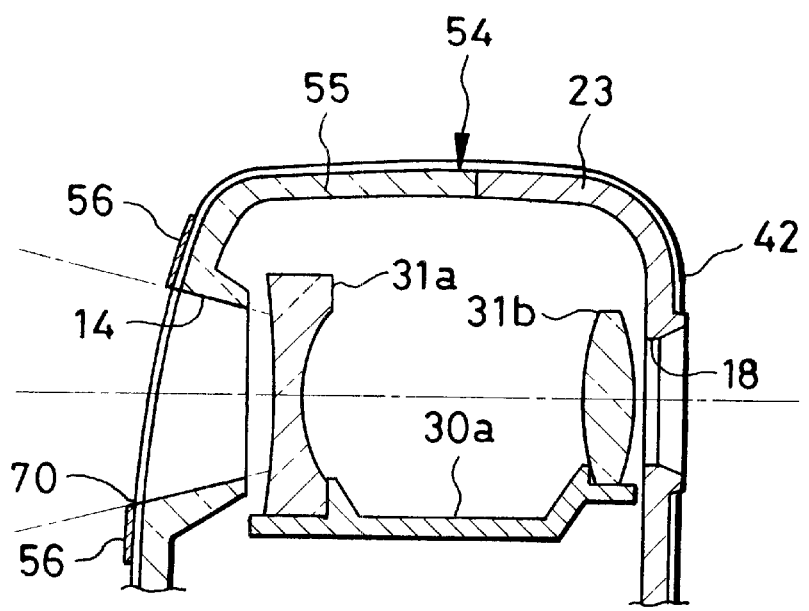
FIG. 6 is a cross section illustrating another preferred viewfinder having a frame-shaped field frame coating pattern.

In FIG. 6, another preferred embodiment is depicted, in which a field frame coating pattern 56 is printed opaquely on the outer packaging belt 42 in which a housing 54 is wrapped. Light from the outside of the photographable region is prevented by the field frame coating pattern 56 from entry into a viewfinder light path. It is preferable for the field frame coating pattern 56 to have a black or dark gray color for easy discernment from the decorative pattern in the outer packaging belt 42. Note that, even in a lens-fitted photo film unit with a box-shaped outer packaging member, the field frame coating pattern 56 can be printed opaquely on the box-shaped member. Light from the outside of the photographable region is prevented by the field frame coating pattern 56 from entry into the viewfinder light path. The field frame coating pattern 56 may be printed particularly on an inner surface of the box-shaped member. According to the present embodiment, a front cover 55 of the housing 54 is identical with that in a conventional lens-fitted photo film unit. There is an advantage in the use of unchanged molds for forming the front cover 55.

Figure 7:
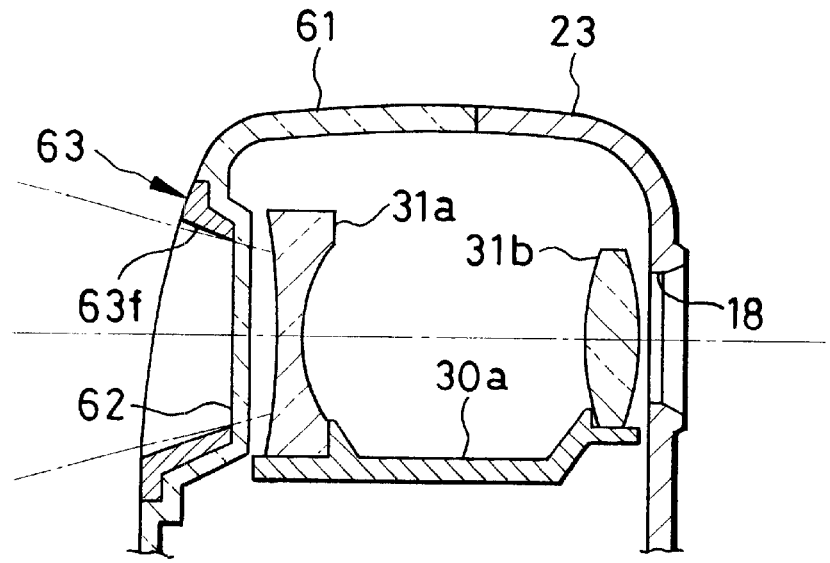
FIG. 7 is a cross section illustrating another preferred viewfinder similar to FIG. 4 but with a transparent plate portion as a viewfinder objective window.

In any of the above embodiment, the viewfinder objective opening 14 is formed as a through hole. In FIG. 7 in contrast, a front cover 61 has colorless transparency, and has a viewfinder objective window 62 as a thin portion without an opening. A recess is formed in the front cover 61 in front of the viewfinder objective window 62. An opaque field frame member 63 or quadrilateral tube is fitted in the recess. According to this embodiment, the front of the objective lens 31a is covered by the front cover 61. This is effective in protecting the housing from entry of unwanted dust or the like through the viewfinder objective window. Note that an inclined surface 63f is provided in the field frame member 63.

Of course, the structure of the viewfinder objective window 62 of FIG. 7 without an opening may be combined with the field frame plate 52 in FIG. 5 or the field frame coating pattern 56 in FIG. 6 to prevent unwanted light from entry into the viewfinder light path.

Figure 8:
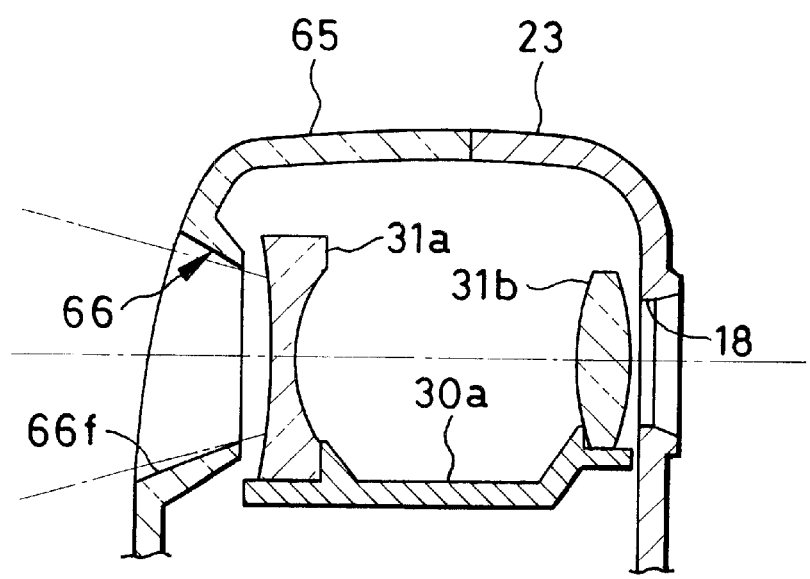
FIG. 8 is a cross section illustrating another preferred viewfinder in which a viewfinder objective window itself constitutes a field frame portion.

In FIG. 8, a still another preferred embodiment is depicted, in which a front cover 65 is formed from colored transparent resin. A viewfinder objective opening 66 is formed in the front cover 65 and has a size predetermined for passage of light from the photographable region. The viewfinder objective opening 66 is discernible from the front cover 65 visually to a user's eye observing through the viewfinder optical system, so that an inclined surface 66f of the viewfinder objective opening 66 constitutes a field frame portion for indicating the photographable region to the user. Specifically, light from the outside of the photographable region travels through the front cover 65 and comes incident to the viewfinder. Part of the light from the outside of the photographable region is colored in the color the same as the front cover 65. However, the part of the light from the inside of the photographable region is not colored, as passed through the viewfinder objective opening 66. Thus, a user can discern the clear region as photographable region, because of the colorless state.

According to the present embodiment, a conventional process of assembling parts of the housing can be used only by coloring the resin for molding the front cover and without adding extra members or structures. Also, the conventional molds for the front cover can be used without changes, as the front cover has the unchanged shape. The colored transparent construction of the front cover provides an agreeable look of the lens-fitted photo film unit. Varieties of the products are also increased.

Note that, in any of the embodiments herein, the term of a "colorless transparent" state for parts of the lens-fitted photo film unit means complete transparency and a state of transmittance of 30%, 50% or so. The term of a "colored transparent" means a state colored but with sufficient transmittance. In short, the colored transparent construction may be any construction in which light incident on it is partially transmitted through it.

In the present embodiment, the part of the light outside the photographable region is colored. Consequently, the outer opening 70 as depicted in FIG. 6 can be formed in the outer packaging belt 42 and can have the size predetermined for passage of light from the photographable region, in combination with the outer packaging belt 42 as a film formed from a colored transparent resin and with the front cover 65 formed from a colorless transparent resin. The part of the light from the inside of the photographable region is not colored, as passed through the viewfinder objective opening 66.

It is noted that the front cover 65 does not require the viewfinder objective opening 66, and can have the viewfinder objective window 62 of FIG. 7 if the front cover 65 is colorless and transparent without coloring light from the photographable region. Also, the outer packaging belt 42 can be formed from colorless transparent film. This is effective because a border between the outer packaging belt 42 and a colorless transparent front cover can be inconspicuous, so that the good appearance can be kept even when wrinkles or looseness in the outer packaging belt 42 occurs in the vicinity of the viewfinder objective window. The outer packaging belt 42 can have the outer opening 70 at the viewfinder objective window, and also can lack the outer opening 70, as the outer packaging belt 42 is colorless and transparent.

Figure 9:
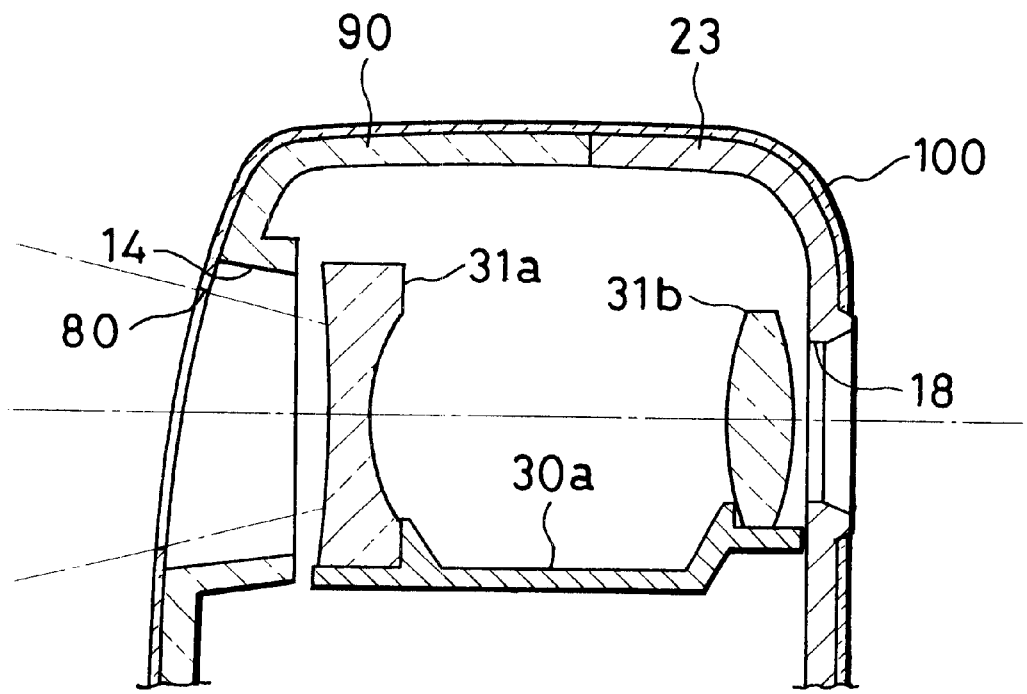
FIG. 9 is a cross section illustrating another preferred embodiment at which an outer opening is smaller than a viewfinder objective window.
Figure 10:
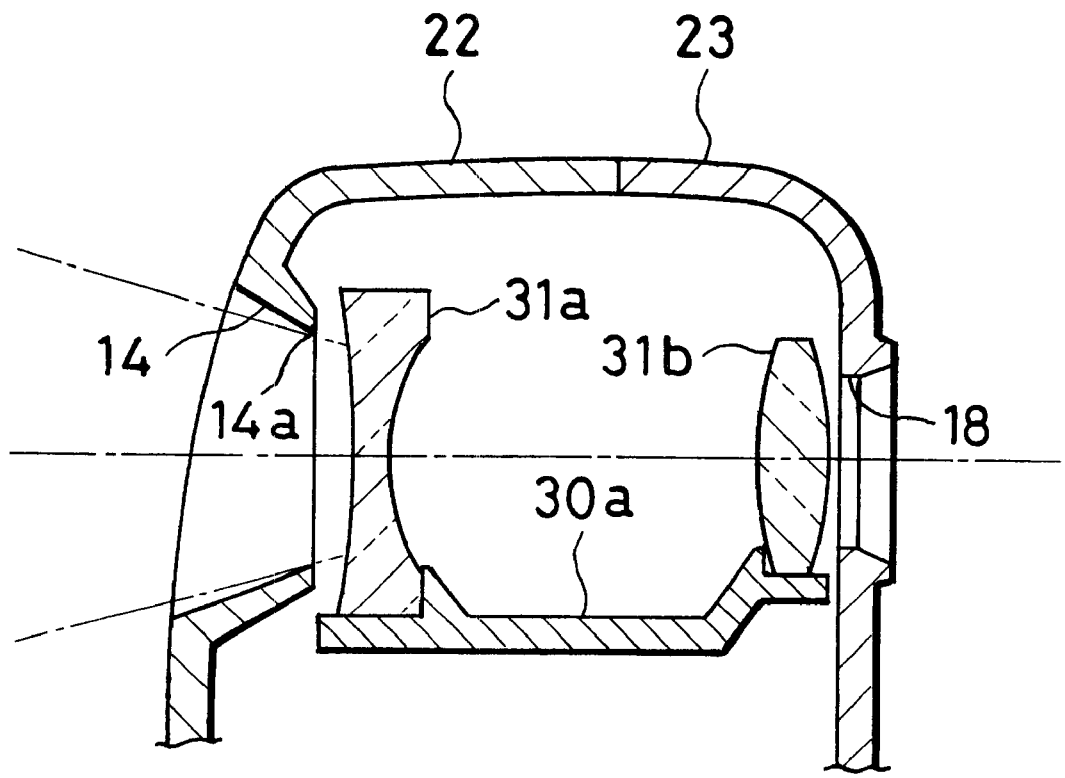
FIG. 10 is a cross section illustrating a viewfinder according to the prior art.

Also, it is possible to form the front cover and outer packaging belt 42 respectively from colored transparent resin in combination with the viewfinder objective opening in the front cover and the outer opening 70 in the outer packaging belt 42. The viewfinder objective opening can have the size predetermined for passage of light from the photographable region. The outer opening 70 uncovers the viewfinder objective opening, and may have a size equal to or greater than that of the viewfinder objective opening. In FIG. 9, a further preferred embodiment is depicted, in which an outer packaging belt 100 is provided with an outer opening 80 as a field frame portion. The outer opening 80 has a size predetermined for passage of light from the photographable region. The viewfinder objective opening 14 in a front cover 90 may have a sufficiently greater size than the outer opening 80.

It is to be noted, in the embodiment of FIG. 9, the outer packaging belt 100 may be colorless and transparent. Only the peripheral edge of the outer opening 80 can be provided with a colored transparent portion or opaque portion by printing. Furthermore, the edge of the outer opening 80 in the outer packaging belt 100 that is colorless and transparent may lack such a printed portion. If the line of the edge is clearly discernible to an observing user's eye, the edge of the outer opening 80 itself can operate as a field frame portion.

Note that, in any of the above embodiments, the outer packaging belt 42, 100 is formed from the resin film. However, the outer packaging belt 42, 100 may be a molded piece of plastic material. Also, a small sheet or card may be used instead of the outer packaging belt 42, 100 and attached to the front cover without wrapping the housing. A packaging member may have a tubular or box shape, and may have any number of side lines, for example four or six side lines. No matter which shape is used for an outer packaging member, it should be formed from resin in view of suitability for recycling.

Also, the front cover 45, 51, 55, 61, 65, 90 may be translucent. In other words, at least one of outer and inner surfaces of the front cover 45, 51, 55, 61, 65, 90 may be a rough surface finished with surface roughness, for example, by matte finish. The rough surface diffuses incident light, and can operate to increase light-shielding capacity of the photo film containing section without degrading the appearance of the product.

In addition to the above embodiments, the front cover 45, 51, 55, 65, 90 of the colored transparency may be combined with the outer packaging belt 42, 100 of the colorless transparency.

Furthermore, the front cover 45, 51, 55, 61, 65, 90 may be produced to be colored and transparent by the following process. A front cover member is formed from colorless transparent resin, then coated with a colored transparent layer by a coating operation, to become the front cover. This coating of the colored transparent layer may lie on the entirety of, or on a portion of, the front cover member.

Also, the front cover 45, 51, 55, 61, 65, 90 that is transparent and colored or colorless may be provided by direct printing with indicia, letters, patterns and the like, which may be opaque partially on a surface of the front cover.

In the above embodiments, the outer packaging belt 42, 100 is transparent. However, the outer packaging belt 42, 100 may be translucent with a surface roughness.

Also, the packaging belt 42, 100 that is transparent and colored or colorless may be provided by direct printing with indicia, letters, patterns and the like, which may be opaque partially on a surface of the packaging belt 42, 100. In addition, the outer packaging belt 42, 100 may a printed sheet with an opaque ground and transparent letters, signs, patterns and the like in an inverted printed manner. Of course, the letters, signs, patterns and the like may have colorless transparency, colored transparency, or translucency with a surface roughness.

Furthermore, the lens-fitted photo film unit in the present invention may lack an outer packaging member, or may have an opaque outer packaging member of any kind. Also, a small sheet or card may be used instead of the outer packaging belt 42, 100 and attached to the rear cover or a top face of the housing.

In the above embodiments, the field frame member 46, the field frame plate 52, the field frame coating pattern 56, the field frame member 63 are opaque. Alternatively, the field frame member 46, the field frame plate 52, the field frame coating pattern 56, the field frame member 63 may have colored transparency, or translucency with a surface roughness.

In the above embodiments, the field frame member 46, the field frame plate 52, the field frame coating pattern 56, the field frame member 63 have a single shape of a rectangular quadrilateral having four sides connected to one another. However, any of them may be a combination of plural members, plates or patterns. Any of them may have a shape including separate points or lines disposed in the quadrilateral shape, for example four indicia disposed at four corners of the quadrilateral, four lines disposed at centers of four sides of the quadrilateral, and a train of numerous points arranged in a manner of broken lines.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, including an opaque main body pre-loaded with photo film, an opaque rear cover for covering a rear of said main body, a front cover for covering a front of said main body, a viewfinder eyepiece opening formed through said rear cover, a viewfinder objective window formed in said front cover, combined with said viewfinder eyepiece opening, and adapted to observation of a photographic field, said lens-fitted photo film unit comprising:

at least a portion of said front cover being produced from material for transmitting light therethrough; and a field frame element, disposed close to said viewfinder objective window, said field frame element defining a photographable region in said photographic field, said field frame element also limiting passage of all light outside the photographable region in said photographic field.

2. A lens-fitted photo film unit as defined in claim 1, wherein said front cover is of resin that is colorless and transparent or is colored and transparent.

3. A lens-fitted photo film unit as defined in claim 2, wherein said field frame element is produced from material for absorbing at least part of light incident thereon, and an inside of said field frame element defines said photographable region.

4. A lens-fitted photo film unit as defined in claim 3, wherein said field frame element is a quadrilateral tube absorbing light incident thereon.

5. A lens-fitted photo film unit as defined in claim 4, wherein said quadrilateral tube is fixedly positioned on said front cover by use of one of forced insertion, caulking, welding and insert molding.

6. A lens-fitted photo film unit as defined in claim 4, wherein said quadrilateral tube has a frame-shaped inclined inside surface inclined at a predetermined incident angle with reference to said viewfinder objective window.

7. A lens-fitted photo film unit as defined in claim 6, wherein said viewfinder objective window is an opening formed through said front cover.

8. A lens-fitted photo film unit as defined in claim 6, wherein said front cover is colorless and transparent, and said viewfinder objective window is a plate-shaped portion of said front cover.

9. A lens-fitted photo film unit as defined in claim 4, wherein said frame-shaped plate is secured to a rear of an edge of said viewfinder objective window.

10. A lens-fitted photo film unit as defined in claim 9, wherein said frame-shaped plate is produced by pressing.

11. A lens-fitted photo film unit as defined in claim 3, wherein said field frame element is a coating formed on an edge of said viewfinder objective window.

12. A lens-fitted photo film unit as defined in claim 3, wherein said front cover is colored and transparent and of resin;

said viewfinder objective window is an opening for passage of light from said photographable range, a portion of said front cover being disposed outside said viewfinder objective opening and constituting said field frame element.

13. A lens-fitted photo film unit as defined in claim 2, comprising:

a housing constituted by combining said main body, said rear cover and said front cover; and an outer packaging member, of which at least a portion is produced from material for transmitting light therethrough, and which is secured to an outside of said housing.

14. A lens-fitted photo film unit as defined in claim 13, wherein said outer packaging member is belt-shaped, and fitted on a rear, a front, a top and a bottom of said housing.

15. A lens-fitted photo film unit as defined in claim 14, wherein said material for said outer packaging member is resin.

16. A lens-fitted photo film unit as defined in claim 13, wherein said outer packaging member has at least a portion for covering a front of said viewfinder objective window;

said field frame element is an opaque coating, formed on said outer packaging member, for defining a periphery of a region equal to or smaller than said viewfinder objective window.

17. A lens-fitted photo film unit as defined in claim 13, wherein said outer packaging member has at least a portion disposed on a front face of said front cover;

further comprising an outer opening, formed in said outer packaging member, disposed in front of said viewfinder objective window, and smaller than said viewfinder objective window, said outer packaging member having a portion, disposed about said outer opening, for constituting said field frame element.

18. A lens-fitted photo film unit as defined in claim 17, wherein said outer packaging member is colored and transparent.

19. A lens-fitted photo film unit as defined in claim 13, wherein said outer packaging member has at least a portion disposed on a front face of said front cover;

further comprising an outer opening, formed in said outer packaging member, for uncovering said viewfinder objective window, said outer opening having an edge for constituting said field frame element.

20. A lens-fitted photo film unit as defined in claim 19, wherein said front cover is colorless and transparent, and said outer packaging member is colored and transparent.

21. A lens-fitted photo film unit as defined in claim 19, wherein said front cover is colored and transparent, and said outer packaging member is colored and transparent.

22. A lens-fitted photo film unit as defined in claim 13, wherein said viewfinder objective window is an opening formed through said front cover, and having an edge for constituting said field frame element;

said outer packaging member has at least a portion disposed on a front face of said front cover;

further comprising an outer opening, formed in said outer packaging member, for uncovering said viewfinder objective opening.

23. A lens-fitted photo film unit as defined in claim 22, wherein said front cover is colored and transparent, and said outer packaging member is colored and transparent.

24. A lens-fitted photo film unit as defined in claim 2, wherein said resin of said front cover is ABS resin, or copolymer resin obtained by copolymerization of polystyrene resin and acrylic resin.

25. A lens-fitted photo film unit as defined in claim 2, wherein said front cover has outer and inner surfaces one of which has surface roughness, and is translucent.

26. A lens-fitted photo film unit as defined in claim 3, wherein said field frame element is a frame-shaped plate of opaque resin absorbing light incident thereon.

27. A lens-fitted photo film unit as defined in claim 4, wherein said frame-shaped plate is fixedly positioned on said front cover by use of one of forced insertion, caulking, welding, and insert molding.

28. A lens-fitted photo film unit comprising:

an opaque main body pre-loaded with photo film;

an opaque rear cover for covering a rear of said main body;

a front cover for covering a front of said main body, at least a portion of said front cover being produced from material for transmitting light therethrough; and an outer packaging member secured to at least an outside of said front cover, at least a portion of said outer packaging member being colorless and transparent or colored and transparent.

29. A lens-fitted photo film unit as defined in claim 28, further comprising:

a viewfinder eyepiece opening formed through said rear cover;

a viewfinder objective window formed in said front cover, combined with said viewfinder eyepiece opening, and adapted to observation of a photographic field; and a field frame element, disposed on the outer packaging member, produced from material for absorbing at least part of light incident thereon, an inside of said field frame element indicating a photographable region in said photographic field.

30. A lens-fitted photo film unit as defined in claim 29, wherein the field frame element defines a photographable region in the photographic field, the field frame element also limiting passage of all light outside the photographable region in the photographic field.

31. A lens-fitted photo film unit, including an opaque main body pre-loaded with photo film, an opaque rear cover for covering a rear of said main body, a front cover for covering a front of said main body, a viewfinder eyepiece opening formed through said rear cover, a viewfinder objective window formed in said front cover, combined with said viewfinder eyepiece opening, and adapted to observation of a photographic field, said lens-fitted photo film unit comprising:

at least a portion of said front cover being produced from material for transmitting light therethrough, said viewfinder objective window being an aperture in the front cover; and a field frame element, disposed along an edge of said viewfinder objective window aperture, said field frame element defining a photographable region in the photographic field, the field frame element also limiting passage of light outside the photographable region in the photographic field.

* * * * *